Patented Jan. 24, 1950

2,495,243

UNITED STATES PATENT OFFICE 2,495,243

ESTERLIKE DERIVATIVES OF AZO DYESTUFFS

Friedrich Felix and Alphonse Heckendorn, Basel, Ernst Reich, Neue Welt, and Fritz Oesterlein, Basel, Switzerland, assignors to Ciba Limited, Basel, Switzerland, a Swiss firm No Drawing. Application September 20, 1945, Serial No. 617,698. In Switzerland October 6, 1944

2 Claims. (Cl. 260—202)

U. S. Patents Nos. 2,170,262, 2,120,741, 2,199,048 and 2,276,187 describe the preparation of esterlike dyestuff derivatives by treating dyestuffs containing hydroxyl groups with organic acylating agents which contain, in addition to the acylating group, at least one substituent which, if necessary after suitable conversion, imparts solubility to the acylation products. These esterification products have hitherto been used principally for dyeing cellulosic materials (cf. U. S. Patent No. 2,095,600).

Application Serial No. 617,697, filed on even date herewith, demonstrates that esters obtained according to the process of U. S. Patents Nos. 2,170,262, 2,120,741, 2,199,048 and 2,276,187, can surprisingly be used with good results for chroming animal fibers if the dyeing is conducted in the presence of ammonium sulfate and an alkali chromate.

The object of the present invention is to produce new esters which are especially suitable for dyeing animal fibers by the process of application Serial No. 617,697. These esters are derived principally from ortho:ortho'-dihydroxyazo dyestuffs obtained from aromatic ortho-hydroxylated diazo compounds and aromatic or heterocyclic hydroxyl compounds which couple in ortho-position with respect to the hydroxyl group, the two components being so selected that the resulting ortho:ortho'-dihydroxyazo-dyestuff, if it contains no nitro groups, will contain at least two substituents which do not impart solubility. In the latter case the resultant dyestuffs are subsequently nitrated. Thus, the dyestuffs are produced by an appropriate combination of diazo compounds, which are made, for example from the ortho-aminophenols or ortho-aminonaphthols or analogues thereof hereinafter mentioned, with coupling components of the type of the hydroxy compounds also mentioned hereinafter.

There may be used as ortho-aminophenols, among others: 1-hydroxy-2-amino-benzene, 1-hydroxy - 2 - amino - 4 - chlorobenzene, 1 - hydroxy - 2 - amino - 4 - nitrobenzene, 1-hydroxy-2-amino-5-nitrobenzene, 1 - hydroxy-2-amino-4:6-dinitrobenzene, 1 - hydroxy - 2-amino - 4:6 - dichlorobenzene, 1 - hydroxy - 2 - amino-3:4:6-trichlorobenzene, 1 - hydroxy-2-amino-3:4:5:6-tetrachlorobenzene, 1-hydroxy-2-amino-4-chloro-5-nitrobenzene, 1 - hydroxy - 2 - amino-4-chloro-6-nitrobenzene, 1-hydroxy - 2 - amino - 4 - nitro-6-chlorobenzene, 1-hydroxy-2-amino - 4 - benzotrifluoride, 1-hydroxy-2-amino-4-methoxybenzene, 1-hydroxy - 2 - aminonaphthalene, 2-hydroxy-1-aminonaphthalene, 1 - hydroxy - 8 - aminonaphthalene, 4' - chloro-4-amino - 2 - methyl - 5 - hydroxy-1:1'-azobenzene, etc. As coupling components there may be used, among others, the following hydroxyl compounds:

1-hydroxynaphthalene, 2-hydroxynaphthalene, 1-hydroxy-4-chloronaphthalene, 1-hydroxy-5:8-dichloronaphthalene, 1-hydroxy-5 - chloronaphthalene, 2-hydroxy - 6 - methoxynaphthalene, 2-hydroxy-7-methoxynaphthalene, 2-hydroxy-4:6-dichloronaphthalene, 2-hydroxy - 4:6 - dibromonaphthalene, 1-hydroxy-4-methoxynaphthalene, 1-hydroxynaphthalene - 4 - methylketone, 1 - hydroxynaphthalene-4-phenylketone, 1-hydroxy-4-ethylnaphthalene, 1 - hydroxy - 5 - nitronaphthalene, 2 - hydroxy - 5 - nitronaphthalene, 2-hydroxy-6-nitronaphthalene; also arylides of 2:3-hydroxynaphthoic acid, such as the condensation products of this acid with amino compounds, such as 1-aminobenzene, 1-amino - 2 - methoxybenzene, 4-amino-1:1'-azobenzene, etc.; also compounds of the benzene series, such as 1-hydroxy-4-methylbenzene, 1 - hydroxy - 2 - allyl-4-methylbenzene, 1-hydroxy-2-n-propyl-4-methylbenzene, 1 - hydroxy-2-isopropyl - 4 - methylbenzene, 1-hydroxy-2-benzyl - 4 - methylbenzene, 1-hydroxy-2-methyl-4-ethylbenzene, 1-hydroxy-2-ethyl-4-methylbenzene, 1 - hydroxy-2-methyl-4-isopropylbenzene, 1 - hydroxy-2-methyl-4-cyclohexylbenzene, 1-hydroxy-2-methyl-4-benzylbenzene, 1-hydroxy-2-benzyl-4-n-propylbenzene, etc.

Hydroxyl compounds are also to be understood to mean compounds containing enolizable keto groups, such as, for instance, 3-methyl-5-pyrazolone, 1-phenyl-3-methyl-5-pyrazolone, 1-(2':5'-dichloro)-phenyl-3-methyl-5-pyrazolone, 1 - (3'-chloro)-phenyl-3-methyl-5-pyrazolone, 1-(3'-nitro)-phenyl-3-methyl - 5 - pyrazolone, 2:4 - dihydroxyquinoline, the anilide of acetoacetic acid, the ortho-anisidide or the para-nitranilide of acetoacetic acid, the 2:4-dichloroanilide of acetoacetic acid, etc. The azo-dyestuffs resulting from these components under the conditions indicated are thus esterified with the esterifying agents of U. S. Patents Nos. 2,170,262, 2,120,741, 2,199,048 and 2,276,187 such as, for example benzoylchloride sulfonic acid, benzoic acid-3-sulfochloride, dichloride of meta-sulfobenzoic acid, benzoic acid-3:5-disulfo-chloride, sulfosalicylic acid dichloride, sulfo-acetic acid chloride, 4-chloromethylbenzoylchloride, etc., advantageously in the presence of a tertiary base, such as pyridine or thiazole.

The new dyestuffs thus correspond to the general formula

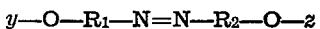

in which the symbol $y$—O— is in ortho-position to the azo group, and the symbol —O—$z$ in an adjacent position to the azo group, —$R_1$—N=N—$R_2$— stands for the radical of an azo compound in which $R_1$ represents an aromatic radical selected from the group of aromatic radicals of the benzene and of the naphthalene series, and $R_2$ stands for the radical of a coupling component, at least one of the radicals $R_1$ and $R_2$ containing at least one nitro group, $y$ standing for an acyl radical containing at least one salt-forming group selected from the group consisting of the radical of a quaternary ammonium group and of a sulfonic group, and $z$ for a member of the group consisting of hydrogen and an acyl radical containing at least one salt-forming group selected from the group consisting of the radical of a quaternary ammonium group and of a sulfonic group.

The esterification products may be worked up in such a manner that after the reaction is completed, the tertiary base is distilled off under reduced pressure and the residue is transferred into a salt solution, whereby the esterification products are separated.

The latter may also be obtained in the form of more difficultly soluble double salts, for instance zinc double salts, if a suitable metal chloride, such as, for instance, zinc chloride or inorganic or organic acids are added, to the original reaction mixture.

The following examples illustrate the invention, but are not to be regarded as limiting it in any way, the parts being by weight:

EXAMPLE 1

3.1 parts of the dyestuff obtained from diazotized 1-hydroxy-2-amino-5-nitrobenzene and 2-hydroxynaphthalene are introduced at a temperature of 40-45° C. into a solution of 20 parts of pyridine and 5.7 parts of benzoic acid-3-sulfochloride and stirred for one hour at this temperature. The pyridine is then distilled off under reduced pressure and the residue is introduced into 100 parts of a sodium chloride solution of 20 per cent strength and stirred, whereafter the dyestuff is filtered off and dried in a vacuum at 30-40° C.

The new dyestuff which probably corresponds in the free form to the formula

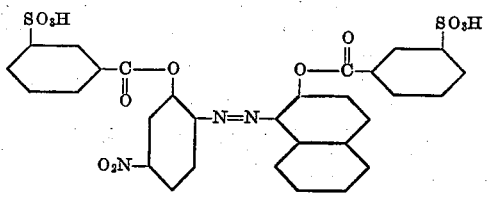

forms a red powder which dissolves in water with an orange coloration and dyes wool from a neutral solution in the presence of chromium salts and also according to the after-chroming process very fast black tints.

A similar dyestuff is obtained by replacing the above 5.7 parts of benzoic acid-3-sulfochloride by 8.2 parts of benzoic acid-3:5-disulfochloride, this dyestuff corresponding in the free form very probably to the formula

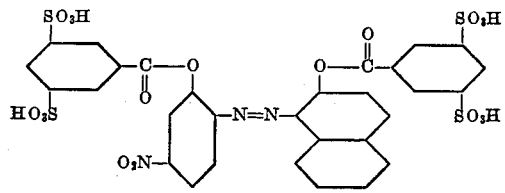

When using, instead of the above mentioned 8.2 parts, 4.1 parts of benzoic acid-3:5-disulfochloride, there is obtained a dyestuff which very probably corresponds in the free form to the formula

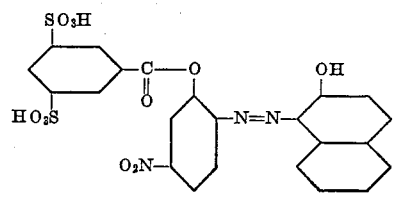

or

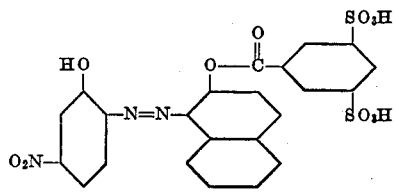

EXAMPLE 2

3.1 parts of the dyestuff obtained from diazotized 1-hydroxy-2-amino-4-nitrobenzene and 2-hydroxynaphthalene are esterified and worked up as indicated in Example 1 with 5.7 parts of benzoic acid-3-sulfochloride. The new dyestuff dissolves in distilled water with a reddish-yellow coloration and dyes wool according to the usual methods in the presence of chromium salts fast brown tints. The new dyestuff probably corresponds in the free form to the formula

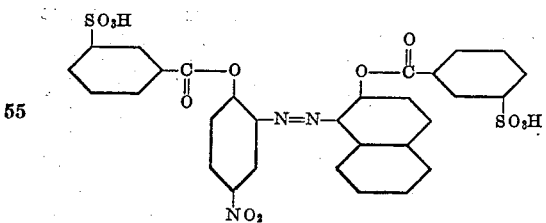

A similar dyestuff is also obtained by replacing the 5.7 parts of benzoylchloride-3-sulfonic acid by 8.2 parts of benzoic acid-3:5-disulfochloride. Such a dyestuff corresponds very probably to the formula

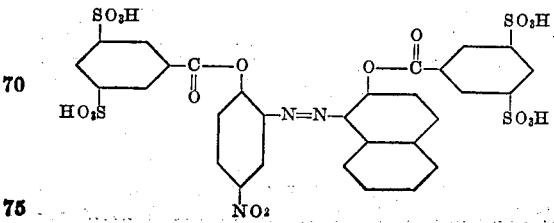

EXAMPLE 3

3.4 parts of the dyestuff obtained from diazotized 1-hydroxy-2-amino-4-chloro-5-nitrobenzene and 2-hydroxynaphthalene are esterified and worked up as indicated in Example 1 with 5.7 parts of benzoic acid-3-sulfochloride. The new dyestuff which in the free form probably corresponds to the formula

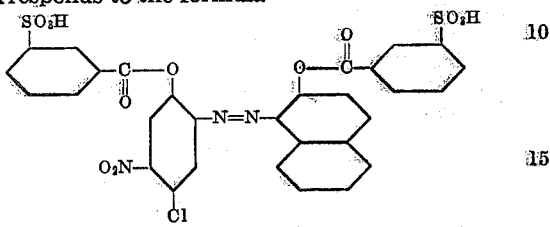

dissolves in distilled water to give a red coloration and dyes wool in the presence of chromium salts navy blue tints with very good properties of fastness.

EXAMPLE 4

3.4 parts of the dyestuff obtained from diazotized 1-hydroxy-2-amino-4-chloro-6-nitrobenzene and 2-hydroxynaphthalene are esterfied and worked up as indicated in Example 1 with 5.7 parts of benzoic acid-3-sulfochloride. The new dyestuff which in the free form probably corresponds to the formula

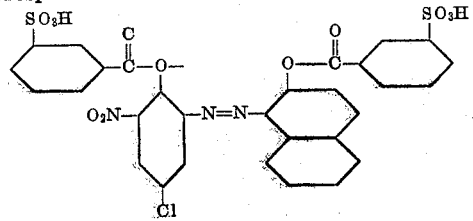

dissolves in distilled water with an orange coloration and dyes wool in the presence of chromium salts reddish blue tints of very good properties of fastness. A similar product is obtained with benzoic acid-3:5-disulfochloride as acylating agent.

The dyestuff obtained from diazontized 1-hydroxy-2-amino-4-nitronaphthalene and 2-hydroxynaphthalene can also be esterified with benzoic acid sulfochloride. This dyestuff dyes wool in the presence of chromium salts very fast black shades.

Such dyestuffs may be obtained alternatively by subjecting, for example, the dyestuff obtained by coupling the diazo compound of 1-hydroxy-2-amino-4-chlorobenzene with 2-hydroxynaphthalene, to nitration, it being assumed that the nitro group enters into the nucleus of the hydroxynaphthalene. This dyestuff is then also converted into the ester by treating with 1-benzoic acid sulfochloride.

It is often also advantageous to use 4-chloromethylbenzoylchloride as acylating agent, and the dyestuff of the probable formula

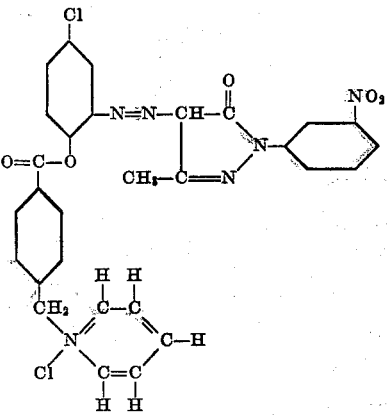

is then obtained by esterifying the dyestuff from diazotized 1-hydroxy-2-amino-4-chlorobenzene and 1-(3'-nitrophenyl)-3-methyl-5-pyrazolone in pyridine.

The following table gives further examples of dyestuffs obtainable in accordance with the present invention:

Table

| Azo dyestuff from— | | Acylating agent | Dyeing of the chromium complex on wool |
|---|---|---|---|
| diazo component | coupling component | | |
| (1) 1-hydroxy-2-amino-5-nitrobenzene | 1-hydroxy-5.8-dichloro-naphthalene | benzoic acid-3-sulfochloride | gray-blue. |
| (2) 1-hydroxy-2-amino-4-chloro-6-nitrobenzene | same | same | blue. |
| (3) same | 1-hydroxy-4-methylbenzene | same | violet-brown. |
| (4) 1-hydroxy-2-amino-4:6-dinitrobenzene | same | same | brown. |
| (5) 1-hydroxy-2-amino-5-nitrobenzene | 1-phenyl-3-methyl-5-pyrazolone | benzoic acid-3:5-disulfochloride | red. |
| (6) 1-hydroxy-2-amino-4-nitrobenzene | same | same | orange. |
| (7) same | 2:4-dihydroxyquinoline | same | red. |
| (8) same | acetoacetic acid-ortho-anisidide | same | yellow-orange. |
| (9) 1-hydroxy-2-amino-4-chlorobenzene | 1-meta-nitrophenyl-3-methyl-5-pyrazolone | same | red. |

The dyestuffs of this table probably correspond in their free form to the following formulas:

(1) 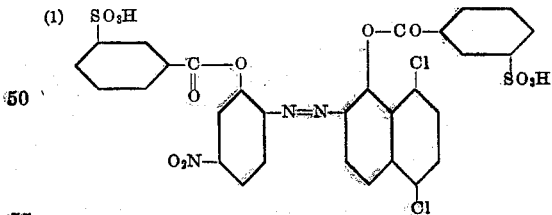

(2) 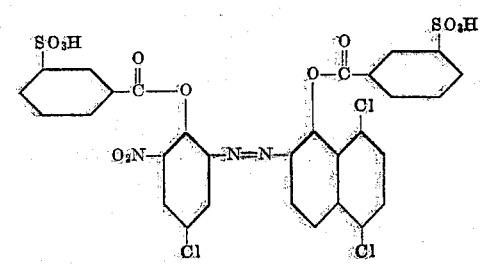

(3) 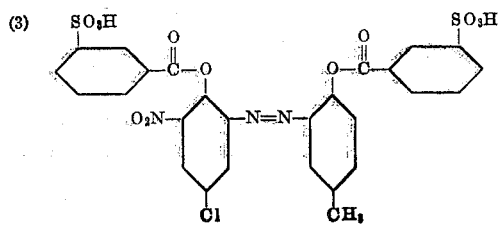

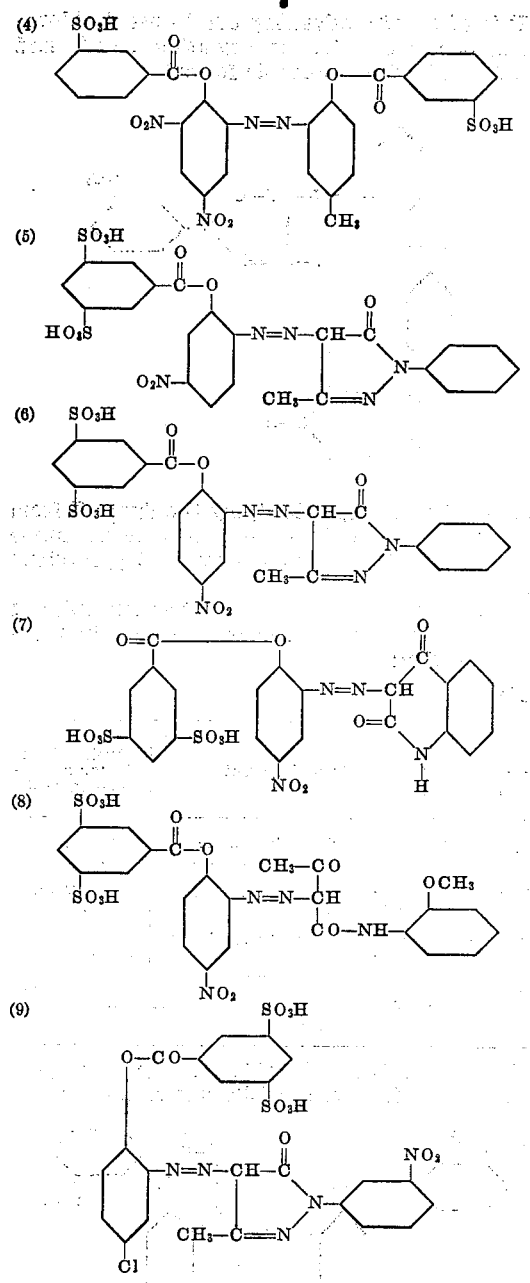

EXAMPLE 5

100 parts of well wetted wool are introduced at 60° C. in a dyebath containing in 4000 parts of water 4 parts of the dyestuff obtainable according to the first paragraph of Example 1, 3 parts of ammonium sulfate, 3 parts of sodium chromate and 10 parts of Glauber salt. In the course of 30 minutes, the temperature is raised to the boil and the wool is dyed at the boil for ¾ hour. After the addition of 0.5–1 per cent. of acetic acid of 40 per cent. strength dyeing is continued for another hour at the boil. The wool is then rinsed and dried. It is dyed a fast black tint.

EXAMPLE 6

100 parts of well wetted wool are introduced at 60° C. into a dyebath containing in 4000 parts of water 1 part of the dyestuff obtainable according to Example 3, 4 parts of acetic acid and 10 parts of Glauber salt. In the course of 30 minutes, the temperature is raised to the boiling point and the wool is dyed at the boil for ¾ hour. After the addition of 1 part of sulfuric acid of 66° Bé. dyeing is continued for another 15 minutes at the boil, the dyebath is then cooled to about 70° C., 1 part of potassium bichromate is added, the temperature is raised to the boiling point and chroming is carried out for about 40 minutes at the boil. The wool is then rinsed and dried. It is dyed a fast navy blue tint.

What we claim is:

1. The ester-like azo dyestuff derivatives of the formula

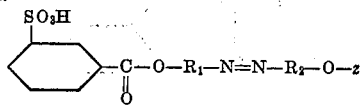

in which the

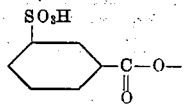

radical is in ortho-position to the azo group and the radical —O—z is in a position adjacent the azo group, one of the symbols $R_1$ and $R_2$ represents a benzene radical containing a nitro group, the other one of the symbols $R_1$ and $R_2$ represents a naphthalene radical, $R_1$ and $R_2$ being free from water-solubility-imparting substituents, and z stands for a member selected from the group consisting of hydrogen and the radical

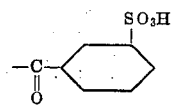

2. The ester-like azo-dyestuff derivatives corresponding in their free form to the general formula

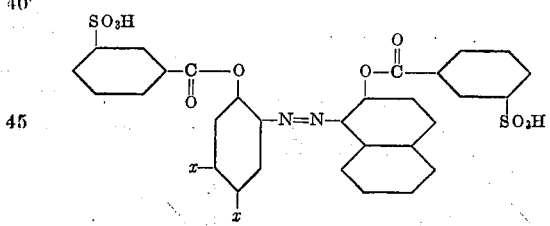

wherein one $x$ stands for hydrogen and the other $x$ for a nitro group.

FRIEDRICH FELIX.
ALPHONSE HECKENDORN.
ERNST REICH.
FRITZ OESTERLEIN.

REFERENCES CITED

The following references are of record in the file of this patent:

UNITED STATES PATENTS

| Number | Name | Date |
|---|---|---|
| 1,994,116 | Staub et al. | Mar. 12, 1935 |
| 2,095,077 | Payne | Oct. 5, 1937 |
| 2,095,600 | Graenacher et al. | Oct. 12, 1937 |
| 2,120,741 | Graenacher et al. | June 14, 1938 |
| 2,170,262 | Graenacher et al. | Aug. 22, 1939 |
| 2,199,048 | Graenacher et al. | Apr. 30, 1940 |
| 2,249,956 | Heyna | July 22, 1941 |
| 2,274,544 | Gubelmann | Feb. 24, 1942 |
| 2,276,187 | Graenacher et al. | Mar. 10, 1942 |
| 2,359,862 | Linch | Oct. 10, 1944 |

Certificate of Correction

Patent No. 2,495,243 January 24, 1950

FRIEDRICH FELIX ET AL.

It is hereby certified that errors appear in the printed specification of the above numbered patent requiring correction as follows:

Column 5, line 26, for "esterfied" read *esterified*; lines 48 and 49, for that portion of the formula reading

column 5, line 61, for "diazontized" read *diazotized*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*